Feb. 23, 1960     J. E. WOODS     2,925,986
PRESSURE OPERATED VALVE
Filed March 31, 1954

*INVENTOR.*
JOHN E. WOODS
BY
ATTORNEYS

United States Patent Office 2,925,986
Patented Feb. 23, 1960

2,925,986

PRESSURE OPERATED VALVE

John E. Woods, Cohasset, Mass., assignor to Standard Thomson Corporation, Boston, Mass., a corporation of Delaware Application March 31, 1954, Serial No. 420,120

2 Claims. (Cl. 251—57)

The present invention relates generally to mechanical energy transducers, and more particularly to transducers capable of remote adjustment for converting volume displacement into lineal mechanical movement or the reverse, in which the ratio of lineal movement to volume displacement is relatively high as compared with similar devices commonly in use.

Mechanical transducers, also known as "actuators," are used in numerous ways, for example as remote, thermostatic, or pressure controls, and the like.

A common example is the thermostatic valve control of an automotive heater system. This system includes a heat exchanger for warming air which enters the passenger compartment. The heat is commonly derived from a liquid coolant circulated through the engine block. The rate of heat exchange is controlled by a thermostatically regulated valve that controls the flow of the liquid through the exchanger. Thermostatic transducers commonly in use for controlling the valve are of various forms. One form uses a vapor-filled system, but such a system has a serious disadvantage in that it restricts the use of various forms of compensation which have been found desirable and in fact necessary in many instances for satisfactory operation. For example, it may be desired to compensate for the ambient temperature outside the passenger compartment or for the air temperature at the outlet of the heat exchanger. In a continuous vapor system, in which the ducts or bulbs sensing these temperatures communicate with one another and with the main thermal bulb in the passenger compartment, the operation of the control is radically affected once the temperature of any part of the system falls below the condensation point. At that point the pressure throughout the system is lost, and variations in the temperatures of warmer parts of the system have no effect.

It is largely for this reason that it is preferable to use thermostatic controls which have thermal materials remaining in the same phase under all conditions. In such a system it is possible to realize compensation by means of a continuous duct having a portion of its volume subjected to each of the compensating temperatures. The valve is controlled by the net effect of the compartment temperature and each of the compensating temperatures, each distributive effect being weighted according to the amount of the total volume subjected to a corresponding temperature.

However, systems operating in a single phase of the thermal fill have also presented difficult problems. In the past, it was common practice to utilize a thermal liquid-filled bellows-type actuator which controlled a pilot valve which in turn controlled the main valve. While such an arrangement is capable of controlling a practicable system, it involves a certain inherent hazard of dirt particles entering, depositing upon, or interfering with the operative parts. Also, it has been recognized that the volume of thermal fill which is necessary to operate the valve may be excessively large and responsiveness accordingly sluggish due to the low linear response per unit volume displacement provided by a bellows.

This invention has as one of its objects the provision of a remotely adjustable, thermostatically controlled transducer, capable of miniaturization if desired, having a high ratio of linear movement to unit volume displacement, and capable of operating the main valve of a heater control system directly by use of a very small volume of thermal material remaining always in the same phase and having a very small volumetric thermal expansion effect as compared with conventional vapor systems.

Another object is to provide a simple and inexpensive thermal control system capable of mass production, while at the same time affording the superior performance of compensated systems, including means for manual or electrical adjustment to the needs of the user.

Further objects are to provide over-travel protection for the transducer, and to reduce ambient temperature effects at the valve, which may be spurious as, for example, in the case of a valve mounted upon an automobile engine block.

With these objects in view, as well as others appearing herein, the features of the present invention include a remotely adjustable transducer in which a volume displacement is converted, through a body of deformable, lubricated substance of limited compressibility such as rubber, into linear displacement of a rigid pin extending into the body. The deformable body is confined within a casing of variable volume having on one side a movable diaphragm. This diaphragm forms an hermetic seal for the system of thermal material, with one side being subjected to the pressure from this material and the other side in contact with the deformable material surrounding the pin.

There is thus provided a unit, which may be manufactured in very small sizes if desired, having a high ratio of lineal movement to volume displacement. In such a unit pressures may be produced in the sealed thermal material of sufficient magnitude to cause appreciable compression thereof. An additional feature resides in the use which is made of compressibility for protection in case of excessive pressures.

Another feature resides in the particular structure of the transducer which, for reasons more fully amplified below, reduces the effect of ambient temperature at the location of the transducer.

Still further features reside in the possibility of using the transducer reversely, that is to convert lineal movement into volume displacement, and in the further possibilities for adaptation of the transducer for either electrical or mechanical adjustment.

When employed in an automotive heater system as a thermostatic valve control, the features of the invention are adapted for compensation and for electrical or mechanical adjustment. Also, by reason of the properties of the actuator, it is possible to make provision to cause a slight closing of the valve as the circulation of coolant increases at higher engines speeds, thus improving the over-all performance by producing a more uniform coolant flow rate for given temperature conditions throughout a considerable range of engine speeds.

Other features of the invention comprise certain structures, combinations and arrangements which will be more readily understood and appreciated with reference to the following description of a preferred embodiment thereof in an automotive heater system.

In the drawings, Fig. 1 is a schematic diagram of an automotive heater system;

Figure 1:
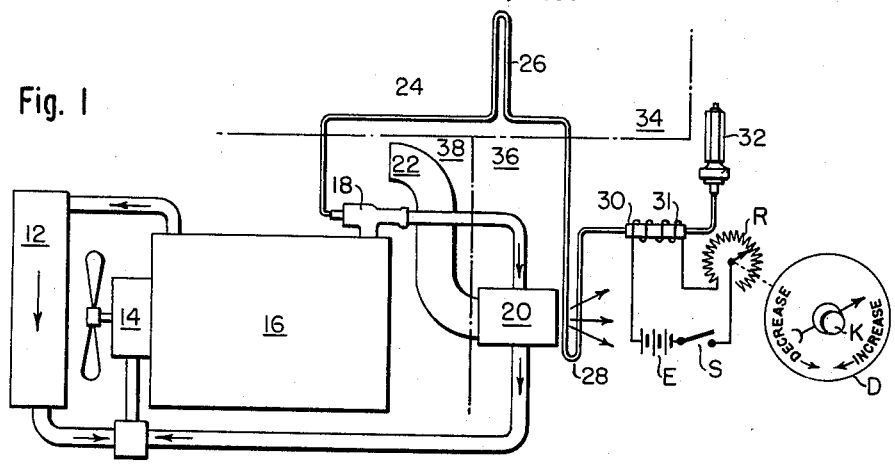

Referring to Fig. 1, there is schematically shown an automotive heater system of a common type. A suitable fluid is circulated through a fan-cooled radiator 12, a water pump 14, and an engine block 16 to cool the engine. A parallel path extends from the engine block, through a thermostatically controlled valve 18, a heat exchanger 20, and the water pump 14, returning to the engine block. An air intake duct 22 is connected with the heat exchanger, whereby the incoming air is brought into close relationship with the tubes carrying liquid through the exchanger. To control the rate of heating of the air by control of the liquid flow through the valve 18, there is provided an arrangement like that described in the copending application of Woods, Serial No. 271,217, filed February 12, 1952, now Patent No. 2,813,680. This includes an hermetically sealed, continuous thermal control system comprising capillary tubing 24 joining a pair of loops 26 and 28, a thermal bulb 30, and a manual adjustment and over-pressure device 32. The valve 18 and the device 32 are more fully described below in connection with Figs. 2 and 3, respectively. The loop 26 is subjected to outside temperature, represented by the space 34, and may be conveniently located under a fender, for example. The loop 28 is subjected to the duct air leaving the exchanger 20, which is located in the passenger compartment 36. The space 38 represents the engine compartment.

The sealed system including the capillary tube 24 and the bulb 30 is completely filled by a material, preferably a liquid in this case, having the property of expanding volumetrically when heated, yet remaining in the same phase under all conditions to be encountered. It will be understood that for many applications other materials such as wax may be preferable, and these are well suited for use in an arrangement such as that described. The total volume of the liquid in the system at any moment depends upon the temperature of the various parts, and upon the amount of the total volume that is situated in each part. The bulb 30 contains a relatively large amount of liquid; hence the system responds principally to the temperature in the passenger compartment. This bulb has a heater coil 31 wrapped around it which is used for temperature control. The coil 31 is in series with a battery E, a switch S and a rheostat R. This control is hereinafter more fully described. The loops 26 and 28 each contain sufficient liquid to shift the control point for purposes of compensation under specified conditions, as explained in the above-mentioned application. The device 32 provides means to shift the control point by manually changing the volume of the system, and also provides over-travel protection which is more fully described below.

The loop 26 compensates for the ambient temperature outside the vehicle. As the ambient temperature falls, the thermal contraction of the fill in the loop compensates for increased heat losses through the windows and walls of the compartment by raising the control temperature. The loop 28 reduces variations of temperature of the air entering through the duct 22. These may be caused by possible changes in the flow rate resulting from changes in the engine speed, where these are not fully compensated for by the arrangement of the valve as described below. Such variations in duct air temperature may also arise from the fact that the same inside and outside air temperatures may occur under some conditions when the coolant temperature is initially high, and under other conditions when the coolant temperature is initially relatively low. By this reduction of duct air temperature variations, the loop 28 prevents both excessively cold and excessively hot duct air from entering the compartment.

Figure 2:
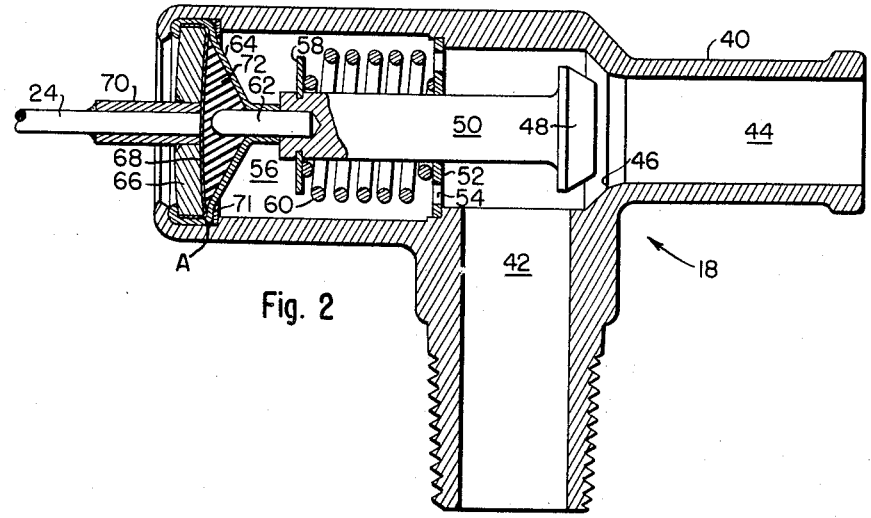
Fig. 2 is an elevation in section of the thermostat valve.

Fig. 2 shows the structure of the valve 18 and its transducer. It consists of a suitable valve body 40 having an inlet passage 42 communicating with the engine block and an outlet passage 44 connected with the heat exchanger 20. It will be understood that the valve may be mounted directly on the engine block as shown in Fig. 1, or it may be situated elsewhere if desired. The passage 44 has a valve seat 46 for a valve plug 48 having a stem 50. It will be noted that the coolant flows through this valve in the reverse direction to that commonly employed. The reason for this is explained below.

The valve stem extends through a plate 52 having perforations 54 into a cylindrical space 56 in the valve body. A retaining ring 58 near the end of the stem retains a compression spring 60 which bears at its other end against the plate 52, urging the valve open. A round ended, rigid, and preferably highly polished pin 62, machined of stainless steel or other suitable material, is received into a hole in the end of the stem. The pin forms a part of the transducer, and projects into the rigid enclosure thereof formed by a conical shaped metal shell 64 and a disk 66 having a central hole. A substantially flat metal diaphragm 68 is soldered, as shown, or welded to the disk. The flanged base of the shell is spun closely around the edges of the disk and diaphragm. A short nipple 70 is soldered or otherwise sealed to the disk, and the capillary tube 24 is sealed to the nipple. In assembly of the valve, the transducer is received into the valve body, and the edges of the body are spun over it to force it tightly against a sealing gasket 71.

The space surrounding the pin 62 is entirely filled by a deformable, lubricated substance 72 of limited compressibility such as a "bleeding" rubber or rubber substitute. Hydraulic pressure in the capillary tube compresses and deforms the rubber through the diaphragm 68, which in turn urges the pin 62 out of the shell 64. This pressure, acting reversely to the spring 60, tends to close the valve. If the hydraulic pressure is sufficiently reduced the spring 60 causes the valve to reach a limiting "full open" position, as shown, with the end of the stem 50 bearing upon the end of the shell 64.

The shell 64 and the diaphragm therefore comprise a casing of variable volume. The assembly comprising the shell 64, the disk 66, the diaphragm 68, the rubber 72 and the pin 62 is a pressure-displacement transducer for converting changes of pressure within the capillary tube to change in the valve opening. It is apparent that when the volume of thermal liquid increases with an increase in temperature, the transducer tends to close the valve. To accomplish this, the liquid forces the diaphragm 68 away from the adjacent wall of the disk 66, thereby displacing a given volume of the rubber. Since the rubber has only very limited compressibility, the pin 62 is forced to displace a corresponding volume. The pin preferably has a small diameter so that a relatively large axial movement is produced.

It will be understood that the pressures induced in the thermal liquid as well as in the rubber are considerable, and may reach 2,000 to 3,000 p.s.i. or higher. Under such conditions the liquid may penetrate the rubber unless it is hermetically sealed therefrom. This is particularly true in miniature systems, wherein the total volume is very small. In one example tested, using a liquid thermal fill, for a pin stroke of one-eighth inch the full stroke of the diaphragm at its center was only .005 inch, and the total corresponding volume displacement only about .001 cubic inch. Leakage of even a small quantity of liquid, or penetration thereof into the rubber, would thus have a very large effect upon the operation. Accordingly, it is an important feature to isolate the liquid from the rubber by the metallic diaphragm 68.

The high pressures encountered also create the problem of possible loss of rubber between the diaphragm and the shell or around the pin. To prevent this, considerable care should be given to the assembly of the transducer. The opening of the shell 64 into which the pin 62 is fitted is formed with precision, and the inside curvature of the shell at A is likewise formed precisely to fit the outer curvature of the diaphragm after assembly thereof over the disk 66. Finally, the edge of the shell is spun over the disk with patricular attention being given to the closeness of fit both at the turned edge and at the point A.

The rubber 72 is preferably molded accurately in a die having a pin similar to the pin 62. This produces a so-called "slug" having a cavity into which the pin 62 is subsequently received. By reason of the design of the unit, the movements of the pin and the deformations of the rubber with long-continued use may, in some instances, cause rupture or pulverization of a part of the "slug." However, this does not render the unit unworkable, since the rubber particles are tightly encased.

In operation, the pressure is relatively uniform throughout the rubber. It is therefore apparent that a frictional force will be exerted upon the pin tending to retard its movement out of the shell 64. On the assumption of uniform pressure, we therefore have the following expression of the condition for movement of the pin:

(axial thrust)     (frictional drag)

$$(1) \quad \frac{p\pi d^2}{4} > f p \pi d L$$

where $p$ is the pressure, $d$ the pin diameter, $f$ the coefficient of friction between the rubber and the pin, and $L$ the projected axial length of the pin in contact with the rubber. This expression reduces to $$(2) \quad \frac{d}{4} > fL$$

Thus, given the friction coefficient, the diameter of the pin defines the limiting extent to which it may be allowed to enter the shell.

The friction coefficient is preferably made as low as practicable. To this end, the pin preferably has a highly polished, inert corrosion-resistant surface, and the rubber is preferably of the "bleeding" type, having appropriate lubricants added to it prior to molding. Oxidation of the pin has been found to cause a marked increase in friction. For this reason stainless steel has been found preferable to some carbon steels, for example, but it will be understood that many other suitable materials including plated metals may also be used.

Another effect of friction may be measured in terms of the curve representing pin displacement versus applied pressure for a series of pressures beginning at a low value, increasing to a relatively high value, and then decreasing toward the initial value. Ideally, the portion of the curve for the displacement values measured on decreasing the pressure would substantially overlie the portion for the values measured on increasing the pressure. We have found that the above-described actuator, when provided with a polished pin and an appropriate surrounding deformable material having a low friction coefficient with the pin, performs more nearly like the ideal case than other actuators of a similar type in present use.

The magnitude of the pressures reached may rise to levels at which the thermal material is markedly compressed. This property of compressibility may be used advantageously for protection in case of excessive pressures. Thus, as the pressure is increased, the pin 62 eventually moves outwardly until the spring 60 is fully compressed. This is the limit of movement of the pin. Any further increase in pressure results in the storage of energy by compression of the fluid. The structural parts must, of course, be strong enough to resist the resultant stress.

The transducer should preferably have as little sensitivity to ambient temperature as possible. This will be particularly evident in the automotive heater application wherein the valve may be mounted directly on the engine block. To this end the volume of rubber is preferably as small as is consistent with its displacement-transmitting function, since rubber itself is well known to have appreciable thermal properties. Also, the diaphragm is preferably of substantially flat shape, rather than corrugated, to insure a close fit. It has been found desirable to fabricate the disk 66 with an outwardly concave wall adjacent the diaphragm and to mold the rubber "slug" with a complementary convexity. In assembly, the rubber forces the diaphragm tightly against the adjacent wall, and thus spurious matter such as moisture in the rubber cavity or fill under the diaphragm which might introduce an ambient effect is substantially excluded. The curvature of the disk wall is preferably such that the diaphragm reaches an equal and opposite curvature after moving through its maximum deflection. Snap action of the diaphragm with such slight deflection is insignificant, and may be reduced by use of a soft metal therefor. For example, using the above figures wherein the center of the diaphragm moves through a maximum deflection of .005 in., the maximum depth of the concavity would then be approximately .0025 in.

It will of course be apparent that the transducer described above is essentially pressure-responsive. Thus, it may be used in any pressure-transmitting system, whether thermostatic or otherwise.

As previously noted, the valve 18 is arranged so that it opens toward the inlet side of the valve seat. Ordinarily, as is well known, this arrangement is reversed because of the tendency of the valve to chatter. However, the valve herein described has no such tendency because the transducer will not allow the valve to yield sufficiently under the pressure. It is therefore possible to utilize the reversed connection further to improve the performance of the valve. It will be appreciated that for a given valve opening the rate of coolant flow is a function of engine speed, and that at higher speeds the heating system, for a given coolant temperature, would ordinarily warm the duct air faster than at lower speeds where a greater valve opening would be required to permit an equivalent rate of heat exchange. However, it may be desired to make the response more uniform throughout a considerable speed range. With the arrangement shown, the increase in inlet presure on the valve plug at the higher engine speeds aids the transducer in the direction to close the valve. By proper choice of the spring rate and effective valve area on the inlet side, the valve may be made to close sufficiently to compensate for the greater coolant pump pressure.

As previously mentioned, the main thermostatic bulb 30 has a heater coil 31 wrapped around it, which provides means for temperature adjustment. This coil is in series with a battery E, which may be the battery of the car, a switch S, which may be the ignition switch, and a rheostat R. The rheostat is preferably hand-operated by a knob K within the reach of the operator on the dashboard. A dial D having any siutable marks is also provided.

By means of this adjustment, there is provided a simple means for controlling the response of the heater system. The heater adds heat at an adjustable rate to the bulb 30, thus producing the same effect as a corresponding, higher compartment temperature.

An important advantage of this system of control, apart from its extreme simplicity and low cost, is the fact that the bulb 30 is connected with the control rheostat only by electrical wires. Consequently, while the rheostat is preferably on the dashboard, the bulb may be placed in any location which adequately reflects the compartment temperature.

Another feature of the rheostat arrangement is that it may be used to reduce the effect of changes in the coolant flow rate resulting from changes in engine speed. As has been previously explained, this effect may be compensated in whole or in part by operation of the loop 28 sensing duct air temperature, or by use of a valve such as that of Fig. 2. In addition to these compensating factors, however, the available voltage also tends to increase with engine speed. The current through the heater thus increases for a given rheostat setting, ultimately causing the valve to close slightly.

Figure 3:
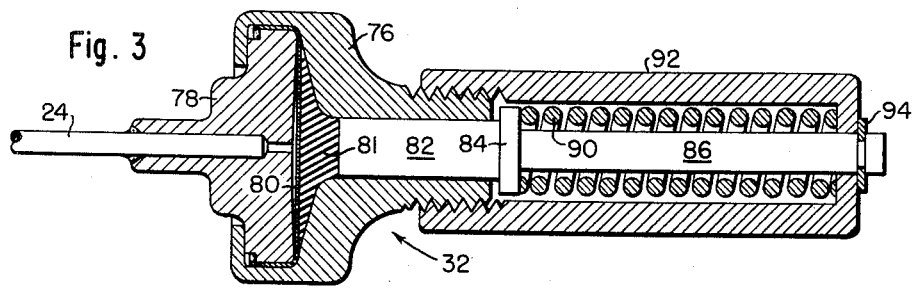
Fig. 3 is an elevation in section of the manual adjustment control and over-travel device for the control system.

Fig. 3 shows the construction of the adjustment and over-travel device. This unit is simply another transducer of the type previously described, which is especially adapted to operate in the reverse direction, that is, to convert the lineal movement of the pin into a volumetric displacement of the thermal liquid. It includes a body 76 corresponding to the shell 64 of Fig. 2, a base 78 having a slight concavity corresponding to the disk 66, a substantially flat diaphragm 80 corresponding to the diaphragm 68, a body of deformable material 81, preferably rubber, having a flat surface in contact with the diaphragm, and a pin 82 corresponding to the pin 62. In assembly, the diaphragm is first soldered to the base, after which the body 76 with the rubber slug inserted in position is assembled over the diaphragm and then spun over the base to form a rigid unit.

The pin 82 is of elongated shape, having a flange 84 and a stem 86 of reduced diameter. The end of the body 76 is externally threaded. A spring 90 is received into a center-bored, internally threaded, hexagonal sided fitting 92. In assembly, the pin is inserted into the fitting and force exerted against the spring to cause the end of the stem to protrude through a hole in the fitting. The stem is then secured by a retaining ring 94. The spring is thus held in compression by a force greater in magnitude than any pressure force exerted upon the end of the pin by the rubber in normal operation of the device.

The unit, when threaded onto the body 76 as shown, permits adjustment of the position of the pin 82 in the body 76 by turning the fitting 92 relative to the body. This constitutes a means for adjusting the total volume within the thermal liquid system and provides means to create a volume displacement of the thermal liquid which has the same effect as an equivalent change in temperature for purposes of manual adjustment.

It will be obvious that over-travel protection is provided by the device 32, since if the rubber is pressed against the pin with sufficient force the spring 90 will be compressed, and the pin will retract to relieve the pressure.

It will be understood that the invention has been described with reference to preferred embodiments which are merely illustrative in nature, and that numerous variations thereof, including those mentioned above and others that will occur to those skilled in the art, may be effected without departing from the spirit or scope of the invention.

Having thus described the invention, I claim:

1. A pressure-controlled valve comprising, in combination, a body defining a fluid conduit and having a valve seat, a valve member having a stem portion and a plug portion adapted to close upon said seat, an enclosure secured to the valve body and defining an enclosed space having two openings therein, a flexible metallic diaphragm supported within the enclosure in position to separate the openings and having a continuous hermetic seal with the wall of the enclosure, a capillary tube communicating with one of the openings and extending to a space remote from the enclosure, said tube and the communicating space in the enclosure being entirely filled with a liquid which remains in the same state under normal operating conditions, the liquid being hermetically sealed in a continuous fused metallic enclosure, a rigid pin slidably supported in the second opening in position to bear upon the valve stem, means tending to urge the pin into the enclosure, and a body of deformable material having limited compressibility adjacent an end of the pin and filling the balance of the space within the enclosure.

2. The valve according to claim 1 wherein the stem of the valve extends from the side of the plug toward which said plug moves to open the valve.

References Cited in the file of this patent

UNITED STATES PATENTS

| | | |
|---|---|---|
| 1,176,727 | Clorius | Mar. 21, 1916 |
| 2,046,578 | Parks | July 7, 1936 |
| 2,101,735 | Fonseca | Dec. 7, 1937 |
| 2,208,149 | Vernet | July 16, 1940 |
| 2,453,851 | Miller | Nov. 16, 1948 |
| 2,534,497 | Albright | Dec. 19, 1950 |
| 2,673,038 | Vernet | Mar. 23, 1954 |

FOREIGN PATENTS

| | | |
|---|---|---|
| 702,868 | France | Jan. 27, 1931 |
| 531,280 | Great Britain | Jan. 1, 1941 |